United States Patent [19]
Kwoh et al.

[11] Patent Number: 5,502,694
[45] Date of Patent: Mar. 26, 1996

[54] METHOD AND APPARATUS FOR COMPRESSED DATA TRANSMISSION

[76] Inventors: Daniel S. Kwoh, 3975 Hampstead Rd., La Canada, Flintridge, Calif. 91011; Hing Y. Ngai, 6922 Lofty Grove Dr., Rancho Palos Verdes, Calif. 90274

[21] Appl. No.: 279,479

[22] Filed: Jul. 22, 1994

[51] Int. Cl.$^6$ ............................................. G11B 19/00
[52] U.S. Cl. ....................... 369/25; 360/79; 360/48
[58] Field of Search ............................ 369/25, 26–29; 360/72.2, 74.4, 79, 48, 50, 18, 22, 69; 434/308, 335, 309, 118

[56] References Cited

U.S. PATENT DOCUMENTS

| | | | |
|---|---|---|---|
| 3,913,135 | 10/1975 | Damlamian | 360/79 |
| 4,377,825 | 3/1983 | Kasubuchi et al. | 360/48 |
| 4,426,684 | 1/1984 | Sechet et al. | 364/900 |
| 4,445,150 | 4/1984 | Nakajima et al. | 360/18 |
| 4,630,143 | 12/1986 | Juso et al. | 360/72.2 |
| 4,684,349 | 8/1987 | Ferguson et al. | 434/308 |
| 4,690,645 | 9/1987 | Ukisu | 434/309 |
| 4,797,750 | 1/1989 | Karweit | 358/335 |
| 4,870,515 | 9/1989 | Stokes | 360/72.2 |
| 4,968,254 | 11/1990 | Gangwere, Jr. et al. | 434/118 |
| 5,398,220 | 3/1995 | Barker | 369/25 |

*Primary Examiner*—Ali Neyzari
*Attorney, Agent, or Firm*—Christie, Parker & Hale

[57] ABSTRACT

Text data is arranged into groups. A unique code is assigned to each group. The data is encoded so that the codes represent the groups. The groups and their assigned codes are transmitted to a receiver where they are stored as a table correlating each group to its assigned code. After the table is transmitted, the program and the encoded text data are transmitted to the receiver, preferably in synchronism. At the receiver, the data is decoded from the table and displayed as the program is reproduced.

16 Claims, 8 Drawing Sheets

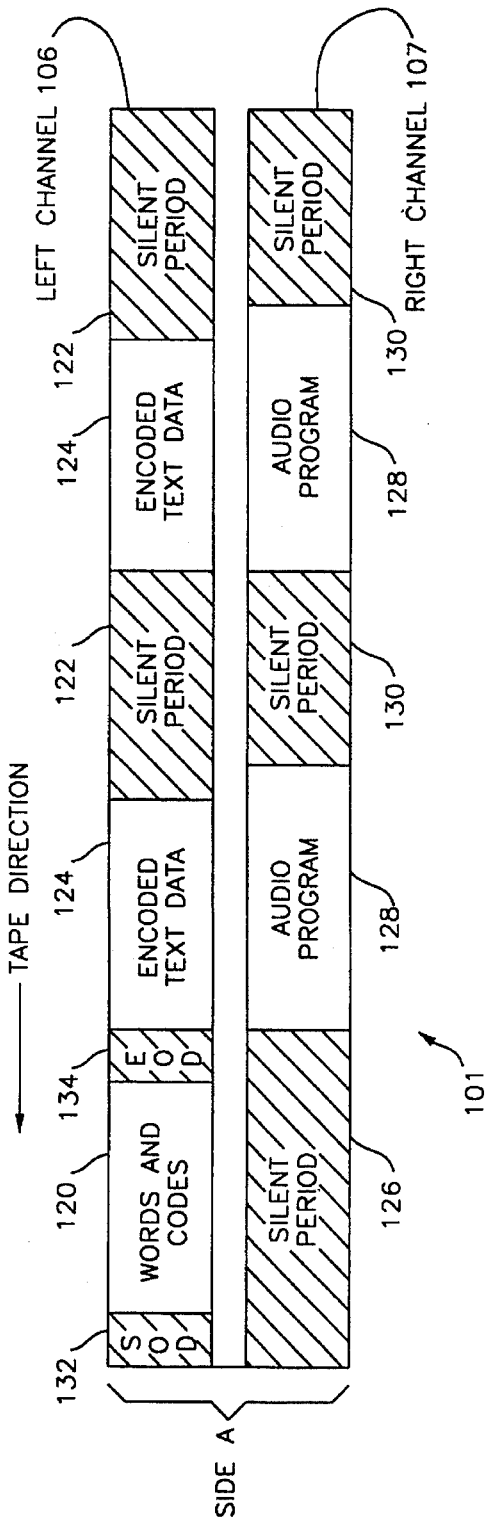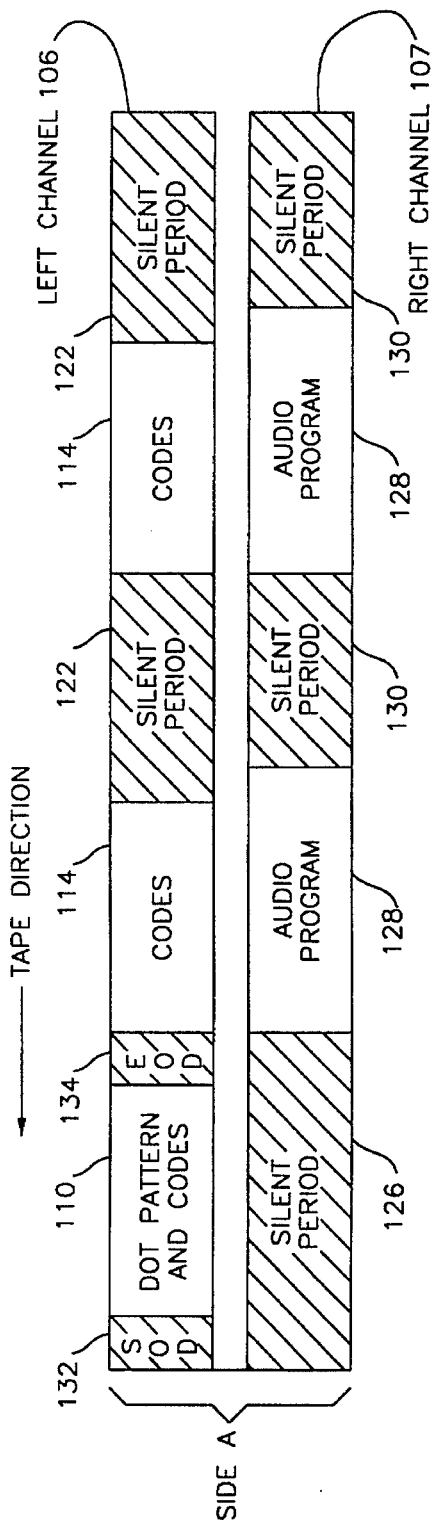

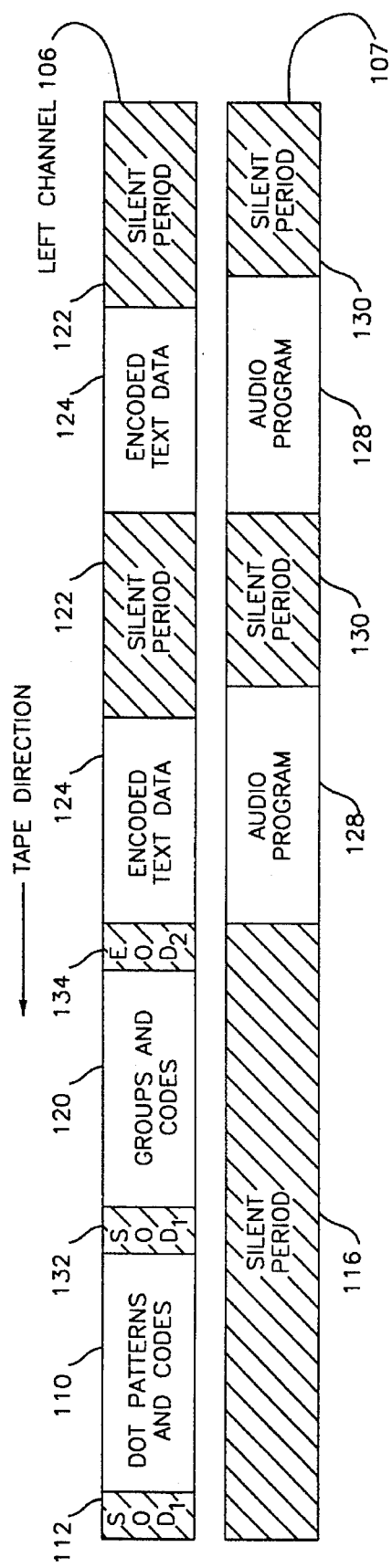

METHOD AND APPARATUS FOR COMPRESSED DATA TRANSMISSION

FIELD OF THE INVENTION

This invention relates to compressed data transmission and, more particularly, to a method and apparatus for transmitting text data with an audio or video program.

BACKGROUND OF THE INVENTION

U.S. patent application Ser. No. 08/001,007 filed on Jan. 5, 1993 discloses an adapter that displays text data as an accompaniment to audio programs such as songs, speech, or foreign language dialog. The adapter is designed to be connected to the audio output socket of a cassette tape player that operates a cassette tape on which text data and audio programs are recorded. The text data is encoded on the tape so it lies within the audio frequency range, for example, as dual tone multi-frequency (DTFM) signals. As the tape player operates, the adapter decodes and displays the text data and transmits the audio programs to an audio output socket. The described adapter has application in karaoke, language instruction, and other environments where reproduction of an audio program is to be accompanied by a real time text display synchronized to the program.

There are stringent limitations on the rate of text data that can be transmitted in the audio frequency range by a cassette tape. These limitations may make it difficult to synchronize the display of text data with an audio program.

If the text data is to be displayed in a symbolic language such as Chinese, rather than an alphabetic language, a dramatic increase in memory capacity of the adapter is needed to store the library of dot patterns required to generate all the characters.

SUMMARY OF THE INVENTION

According to one aspect of the invention, text data is compressed prior to transmission along with an audio or video program to which the text data is related. This increases the information carrying capacity so more text data can be displayed in synchronism with the program. Specifically, the text data is arranged into groups. A unique code is assigned to each group. The data is encoded so that the codes represent the groups. The groups and their assigned codes are transmitted to a receiver where they are stored as a table correlating each group to its assigned code. After the table is transmitted, the program and the encoded text data are transmitted to the receiver, preferably in synchronism. At the receiver, the data is decoded from the table and displayed as the program is reproduced.

In one embodiment, the text data is expressed as alphabetic characters that form words and each group comprises one word. The more repetitions of the words that appear in the text data, the more data compression results.

According to another aspect of the invention applicable when the text data is expressed as symbolic characters formed by patterns of dots, the groups each comprise the pattern of dots that form a character. By transmitting the patterns of dots and their assigned codes to the receiver before the encoded text data, only the dot patterns for those characters actually being displayed with the program must be stored at the receiver, which saves memory space at the display.

In another embodiment, both of the described aspects are combined. The text data is expressed as symbolic characters that are formed by patterns of dots. There are two types of groups—a first type comprising a pattern of dots that forms the respective characters and a second type comprising a plurality of characters. A unique character code is assigned to each pattern of dots and a unique group code is assigned to each plurality of characters. Two blocks of data are transmitted to the receiver prior to the transmission of the encoded text data. One block comprises the dot patterns for the characters with their character codes. The other block comprises the character codes for the characters of each group with their group codes. The encoded text data in the form of group codes is transmitted to the receiver with the audio program. At the receiver, the group of character codes corresponding to each group code is retrieved in turn from the table and then the dot patterns corresponding to these character codes are retrieved in turn from the table for real time display.

BRIEF DESCRIPTION OF THE DRAWINGS

The features of specific embodiments of the best mode contemplated for carrying out the invention are illustrated in the drawings, in which:

FIG. 3 is a schematic diagram of the layout of text data and the audio programs on cassette tape in accordance with the invention;

FIG. 6 is a schematic diagram of cassette tape used with the embodiment of FIG. 5;

FIG. 9 is a diagram of a cassette tape used in conjunction with the system of FIG. 8.

DETAILED DESCRIPTION OF THE SPECIFIC EMBODIMENTS

Figure 1:
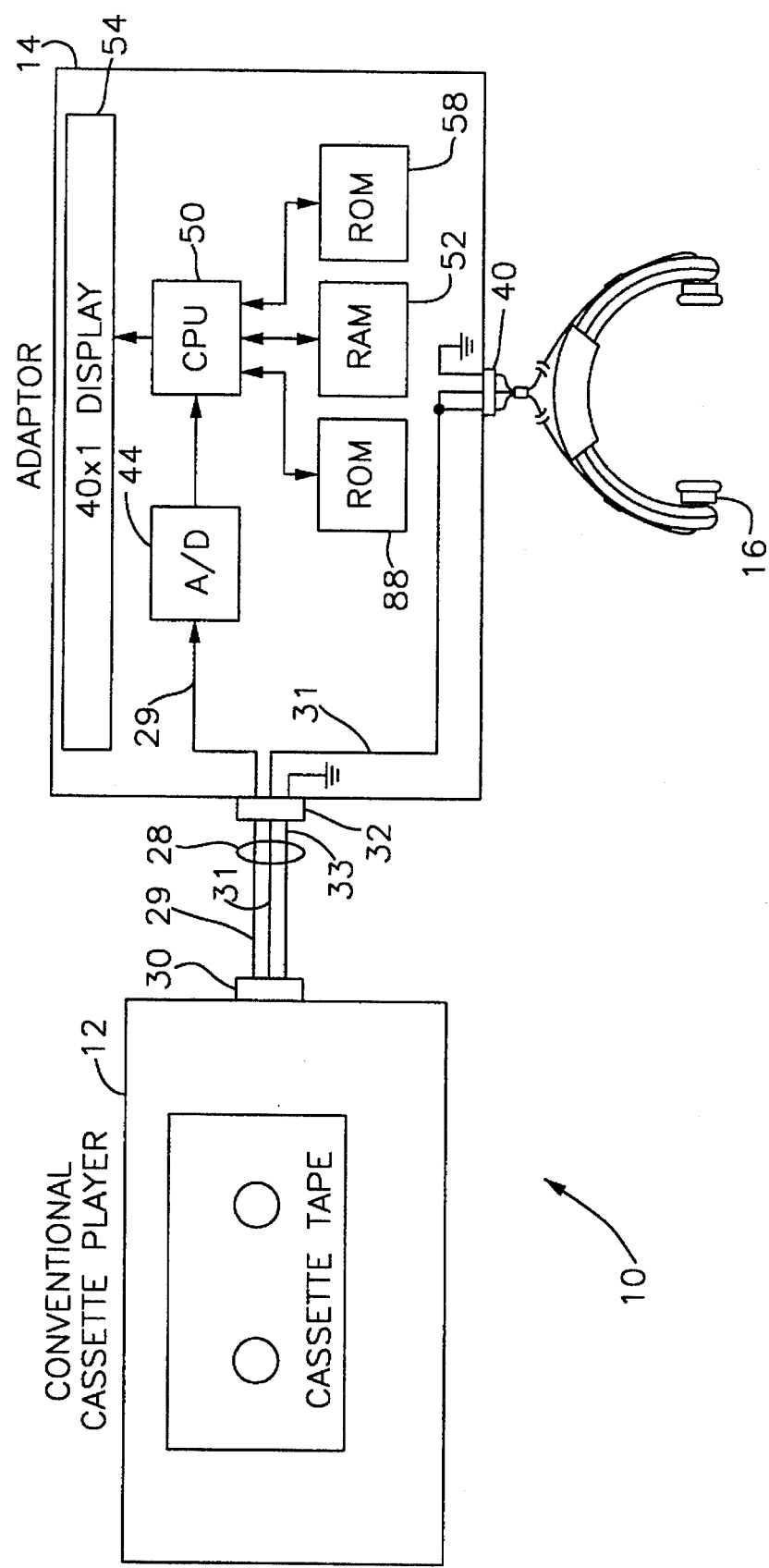
FIG. 1 is a schematic block diagram of a data transmission system practicing the invention.

In FIG. 1 is shown an embodiment of an apparatus for practicing the invention. A conventional cassette player 12 has a stereo output socket 30. An adapter 14 has a stereo input socket 32. The stereo jacks of a stereo cable 28, which has a left channel lead 29, a right channel lead 31 and a ground lead 33, are plugged into sockets 30 and 32 to connect cassette player 12 to adapter 14. In adapter 14, the left channel is connected to an analog to digital converter (A/D) 44 and the right channel is connected to both channels of a stereo output socket 40. A/D 44 is connected to a central processing unit (CPU) 50. CPU 50 controls a visual display 54 such as a 40×11 LCD display. Patterns of dots for forming the letters on display 54 are stored in a read only memory (ROM) 58, which is connected to CPU 50. The operating program for adapter 14 is stored in a read only memory (ROM) 88, which is connected to CPU 50. A random access memory (RAM) 52, which serves as temporary storage for text data displayed by adapter 14, is connected to CPU 50. Memories 52, 58, and 88 could be incorporated in a single memory chip with appropriate program protection. Headphones 16 are connected to socket 40 so that the user can hear the audio program transmitted on lead 31 in monaural sound.

An audio program is recorded on the right channel of the tape played by cassette player 12 and encoded signals representing text for display by adapter 14 are recorded on the left channel of the tape. The text data is encoded in such a manner that the encoded signals preferably lie within the audio frequency band. For example, the text data could be encoded as audio tones, i.e., DTFM signals. This permits the text data to be coupled out of stereo socket 30 along with the audio program. The signal representing the text data is decoded by A/D 44 and coupled to CPU 50. CPU 50 fetches the dot patterns from ROM 58 and feeds them to display 54 in the proper time sequence. As a result, text data can be displayed by adapter 14 at the same time, or at a different but coordinated time, as related audio programming is reproduced by headphones 16. The text data can be stored temporarily in RAM 52 so that it is displayed either a line at a time or in continuously moving form. As described to this point, the apparatus is essentially the subject of co-pending U.S. patent application Ser. No. 08/001,117 9 (Attorney Docket 25171) filed on Jan. 5, 1993, the disclosure of which is incorporated fully herein by reference. The only significant difference is that ROM 58 is not a part of the apparatus of the co-pending application. In that application, the function of ROM 58 is performed by other hardware components.

Now turning to the present invention, the invention permits the text data to be recorded on the tape and transmitted from cassette player 12 to adapter 14 in coded form. As a result, text data can be transmitted from cassette player 12 to adapter 14 more quickly and, if desired, in synchronism with the audio program. Further, some embodiments of the invention also result in memory savings.

According to one embodiment of the invention, text data to be displayed is first arranged into groups such as words. Each group is assigned a unique code. For example, assume that the text data comprises the following song lyrics:

TABLE I

MY BEAUTIFUL LORD
REALLY WANT TO KNOW YOU
REALLY WANT TO GO WITH YOU
REALLY WANT TO SHOW YOU LORD
MY LORD
MY BEAUTIFUL LORD

In such case, the text data can be arranged into groups, each of which comprises for example one word, and unique codes can be assigned to the words as follows:

TABLE II

| Words | Codes |
|---|---|
| My | \ |
| BEAUTIFUL | % |
| LORD | + |
| REALLY | @ |
| WANT | ~ |
| TO | ^ |
| KNOW | # |

TABLE II-continued

| Words | Codes |
|---|---|
| YOU | $ |
| GO | < |
| WITH | * |
| SHOW | > |

Figure 2:
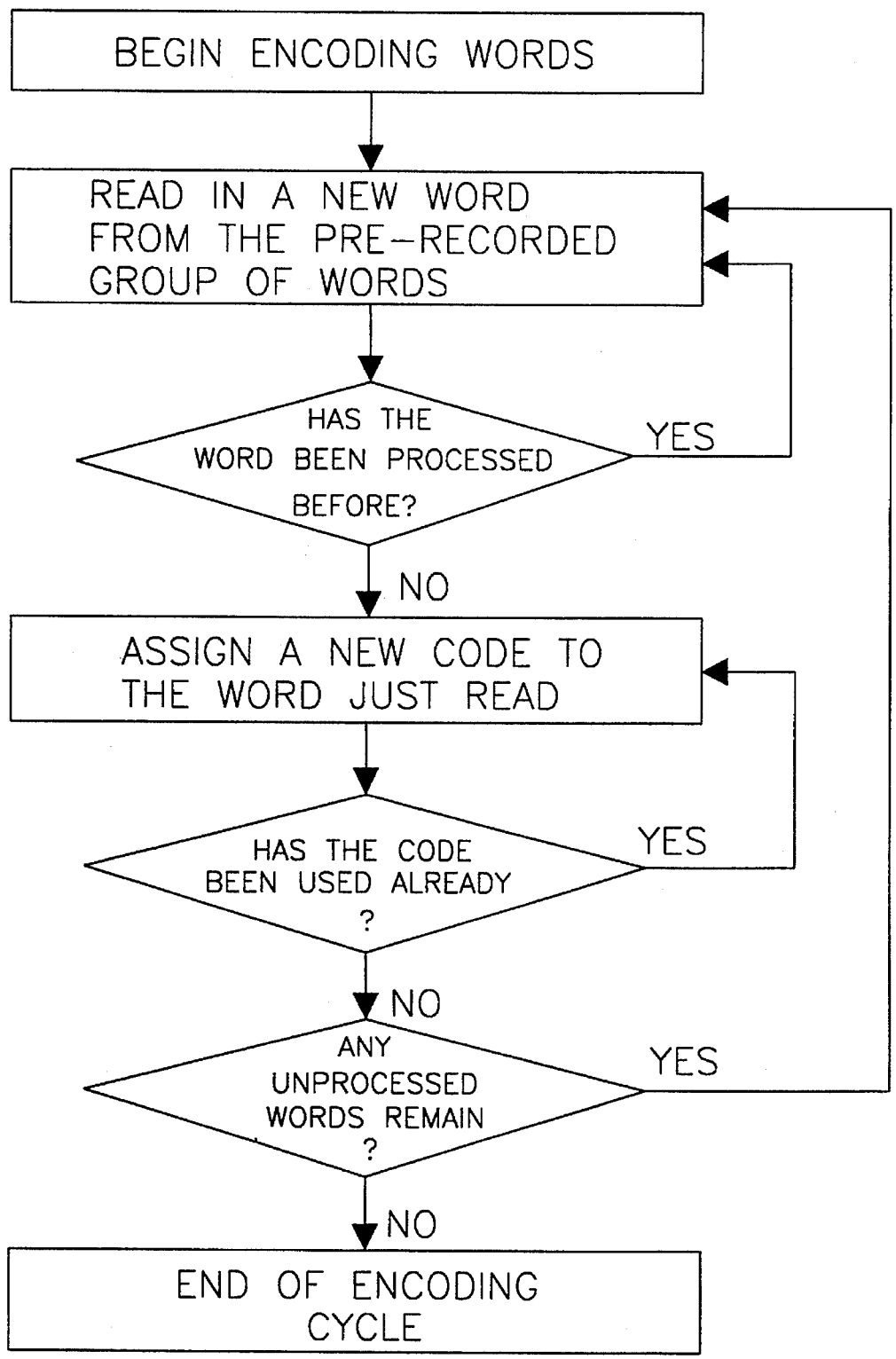
FIG. 2 is a flow diagram of the steps for encoding the text data transmitted in the system of FIG. 1.

Table II is compiled on a computer by executing the flow diagram shown in FIG. 2. As shown in FIG. 2, the encoding of the words begins by reading a new word. The next step is to determine whether the new word just read has already been processed and encoded. If so, a new and different word is ready for processing. If the new word just read has not been processed, a code is assigned to that word. Next, it is determined whether the code has already been assigned to a word. If so, a new and different code is assigned to the word just read. If the code has not already been assigned to a word, the code is assigned to the word just read. Next, the system determines whether any unencoded words are remaining. If so, the process is repeated for a new word until all the prerecorded words are encoded. When the last word has been encoded, the encoding cycle stops.

Preferably, the encoding is performed by assigning a nonalphabetic ASCII character to a word comprised of many alphabetic characters. For example, the word "BEAUTIFUL," comprised of nine characters, is assigned a single-character code, such as the percent sign (%).

As depicted in FIG. 3, the tape in cassette player 12 has a left channel 106 on which the text data is stored and a right channel 107 on which the audio program is stored, usually both in analog form. Prior to the start of an audio program stored on right channel 107, each of the above words and their assigned codes are stored on a segment 120 of left channel 106 of the tape. In the example where the text data of Table I is transmitted, the words and codes of Table II are stored on segment 120. A start of definition (SOD) code segment 132 precedes segment 120 and end of definition (EOD) code segment 134 follows segment 120 to mark it on the tape. During segments 120,132 and 134, there is a silent period 126 on right channel 107. The encoded text data is stored on a segment 124 in left channel 106 which follows segment 134. In the example given above, the encoded text data would comprise the following:

TABLE III

\ % +
@ ~ ^ # $
@ ~ ^ < * $
@ ~ ^ < $ +
\ +
\ % +

A comparison of Table III (coded text data lyrics) with Table I (the original lyrics) illustrates the speed and data compression advantage that can be achieved by the invention. The audio program is stored in a segment 128 on right channel 107, which preferably begins at the same time as segment 124 on left channel 106. A silent period 122 follows segment 124 on left channel 106 and a silent period 130 follows segment 128 on right channel 107. Silent periods 122 and 130 begin when the encoded text data and the audio program, respectively, end. Silent periods 122 and 130 end at the beginning of the next encoded text data segment and audio program.

Figure 4:
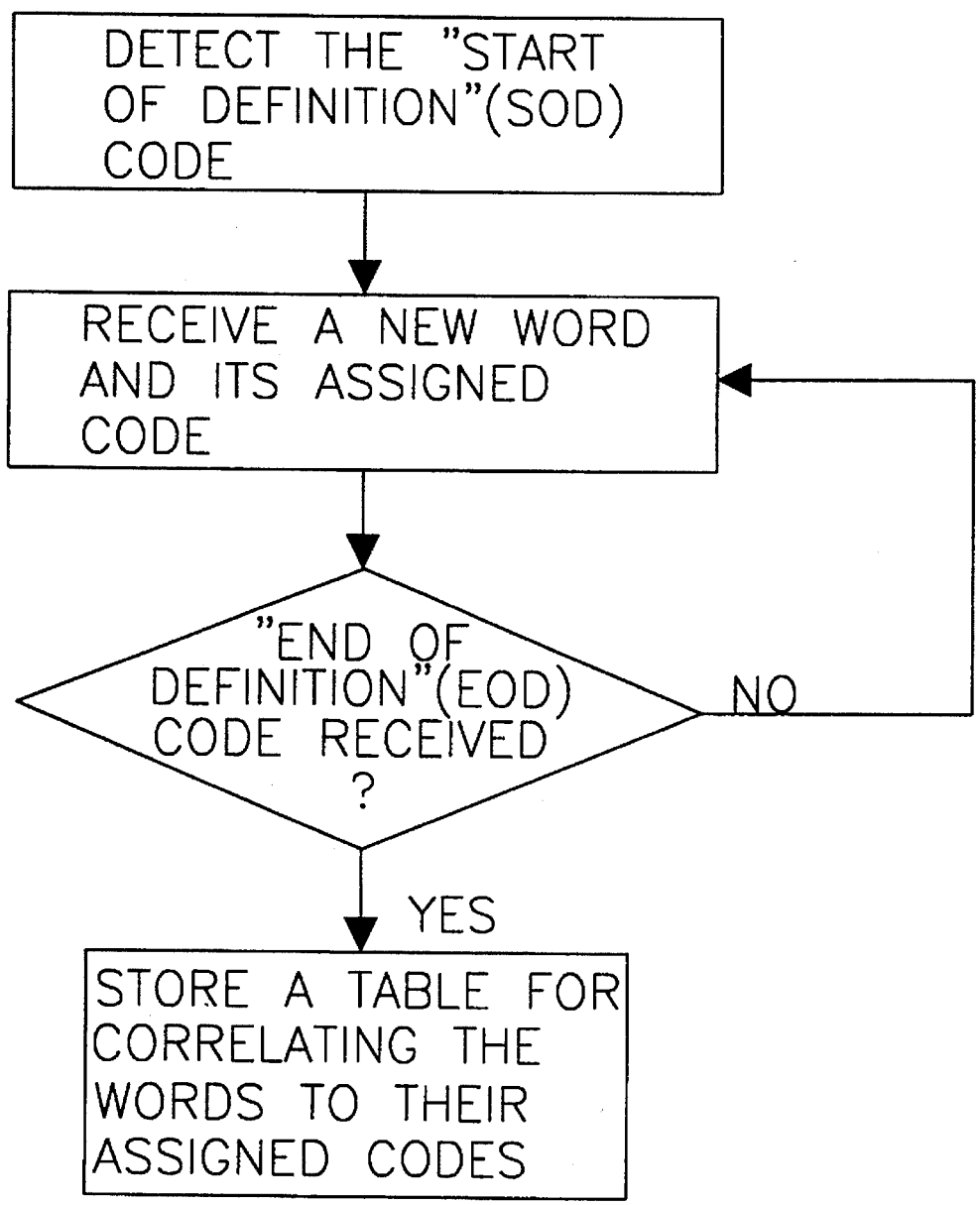
FIG. 4 is a flow diagram of the steps for formatting the cassette tape of FIG. 3.

At the beginning of tape play, the words and codes stored in segment 120 are transmitted to adapter 14. CPU 50 creates a table therefrom, i.e., Table II, which is stored in RAM 52. Thereafter, as the encoded text data from segments 124 is played and transmitted to adapter 14, CPU 50 decodes the text data based on the table of words and codes. The flow diagram of FIG. 4 shows the steps that CPU 50 executes in order to compile and store the table of words and codes. As shown in FIG. 4, CPU 50 begins by detecting the SOD code. After the receipt and recognition of the SOD code, CPU 50 compiles a table for correlating each word to a corresponding code. The table is compiled and stored in RAM 52.

CPU 50 continues compiling and storing the table until CPU 50 receives an EOD code. As the encoded text data is received by adapter 14, CPU 50 under control of the operating program resident in ROM 88 accesses the table in RAM 52 (Table II) to convert each code symbol in turn to the corresponding word and fetches from ROM 58 the pattern of dots forming the letters of the corresponding words on display 54 in synchronization with the audio program.

Some of the advantages of the embodiment of the invention just described are now illustrated by comparison with uncompressed transmission of the entire text data. Consider the words "BEAUTIFUL LORD." The total number of characters of text data to be transmitted is 13. If the text data is stored in digital form and each character is represented by its ASCII equivalent of seven bits, transmission of the entire text "BEAUTIFUL LORD" requires 91 bits. The transmission of these bits is performed serially over lead 29, which represents a critical limitation on the display of the text data. This is because all the other data processing components of adapter 14, such as the analog-to-digital converter 44, CPU 50, ROM 88 and RAM 52, must await the completion of this serial transmission. Thus, speeding up the serial transmission significantly reduces the amount of time needed to process and display the words. In contrast, the transmission of the codes representing the compressed text data occurs at a much faster rate. For example, the words "BEAUTIFUL LORD" are represented by only two single-character codes, i.e., "%" and "+". In the example, only 14 bits are transmitted instead of 91 bits. This reduction in the number of bits reduces the transmission time and quantity of data transmitted by a factor of greater than six.

The invention as described results in two separate advantages. First, in many forms of prerecorded text data, such as words of a song, the words or phrases are repeated many times. Each time that a word or phrase is transmitted, the invention saves transmission time as explained above.

Second, the limits of the audio channel carrying capacity and the text data character transmission time may cause the transmission time of text data comprising many words to exceed the audio program transmission time if the text data were transmitted as individual characters. The present invention permits the many words of the text data to be displayed in synchronism with the audio program by encoding the words as explained above and by transmitting the words and codes 120 prior to the audio program transmission.

In another implementation of this embodiment, the text data is arranged into groups comprising a plurality of words, i.e., a single code may be assigned to a series of words. In the example, the series of words "MY BEAUTIFUL LORD" may be represented by a single code, such as "¡". This may further add to the speed and synchronization advantages of the invention.

Another embodiment of the invention is particularly well suited to transmission of unique and rarely used symbolic characters and their processing and display at adapter 14. In this embodiment, as shown in FIGS. 5, 6, 7A, and 7B, the text data comprises pattern of dots that define symbolic characters 84 and 86 such as the shape of the Greek symbol pi ($\pi$) and delta ($\Delta$). Assume, for example, that the dots comprising the text data are arranged into the shape of a delta ($\Delta$) and a unique nonalphabetic ASCII code such as "%" is assigned to that pattern. Suppose further that the pattern of dots defining the symbol pi ($\pi$) is assigned the code "&".

The dot patterns defining "$\Delta$" and "$\pi$" and their respective codes, namely "%" and "&", are stored in segment 110 of left channel 106 of FIG. 6. The respective codes for the symbolic characters (without the dot patterns) are stored in segments 114 in the order and timing that the symbols they represent are to be displayed, separated by silent periods 122. The audio programs related to code segments 114 are stored on audio segments 128 of right channel 107. In adapter 14, a RAM 68 replaces ROM 58 and RAM 52 is not needed. As segment 110 is played on cassette player 12, CPU 50 stores each pattern of dots and its respective assigned code in RAM 68. Only the patterns of dots required to display the specific text data are transmitted and stored in RAM 68. For example, the codes "%" and "&" and their respective patterns of dots defining the "$\Delta$" and the "$\pi$", as well as the codes and the patterns of dots defining the other symbolic characters of the text data to be displayed, are stored in segment 110 and these codes and respective patterns of dots are stored in RAM 68 after the segment 110 is played. The patterns of dots assigned to the codes in segment 110 are recalled from memory 68 as the codes in segments 114 are received upon the further playing of the tape and thus the symbolic characters such as the "$\Delta$" and "$\pi$" appear on display 54 in synchronism with the audio program. This technique can also be used to transmit and display text data in symbolic languages such as Chinese, Japanese, or Korean.

Figure 7A:
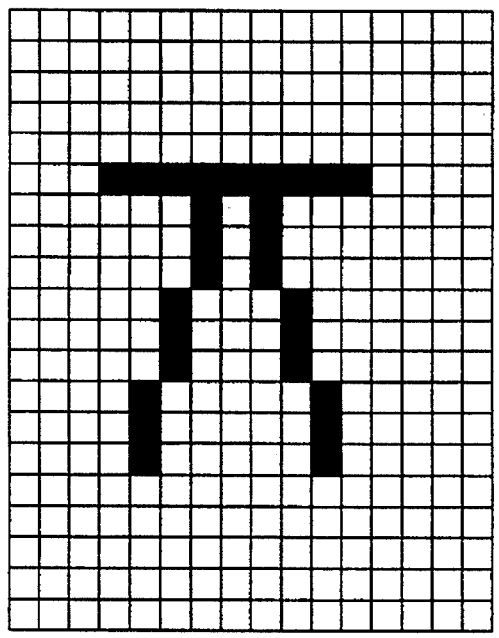
FIG. 7A is a diagram of dot patterns for generating the Greek letter pi (π)
Figure 7B:
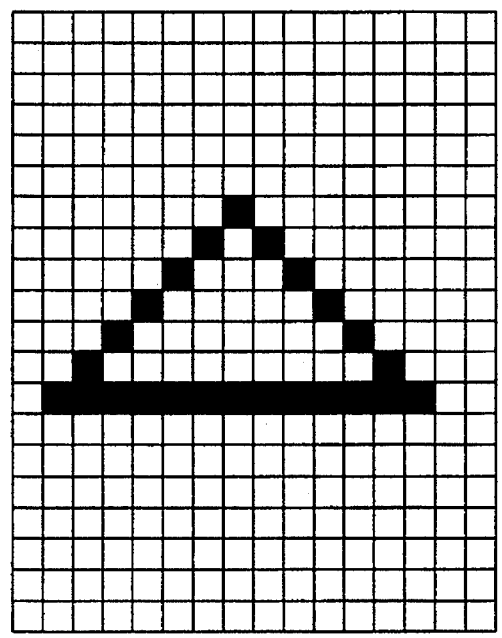
FIG. 7B is a diagram of dot patterns for generating the Greek letter delta (Δ)

As shown in FIG. 7A, each unique or rarely used symbolic character, for example the symbol $\pi$, typically requires a 16×20 dot matrix display. Thus, to define and display the symbol $\pi$, a pattern of 320 dots must be defined and displayed at the receiver. The prior art utilizes a very large ROM to store the patterns of dots required to process and display a large number of unique characters. For example, to accommodate the processing and display of 10,000 characters on a 16×20 dot matrix display, a ROM size of 10,000× 16×20 bits (or 3.2 megabits) is required. Furthermore, it does not appear possible that this prior art technique can accommodate the transmission, processing and display of every possible unique character. This is because there is almost an infinite number of possible characters that may be displayed on a dot matrix display. The prior art's requirement of a large ROM results in additional expenses associated with manufacturing or purchase of a large ROM, the additional power consumption associated with a large ROM, and the larger size of the final product. Another prior art alternative is to use a specialized or custom-made ROM if the type of application that the ROM would be employed in is known in advance. A major problem with this approach is that the receiver cannot process and display characters whose patterns of dots are not present in the custom-made ROM; thus, a different ROM is required for different types of applications.

The embodiment of the invention just described resolves the problems of the prior art. As explained above, segment 110 is transmitted to adapter 14 and stored in RAM 68, which replaces the prior art ROM. During playback of segment 110, only the patterns of dots defining those unique characters to be displayed at dot matrix display 54 are stored in RAM 68. Thus, the need for a large ROM or a custom-made ROM is eliminated. Further, adapter 14 is now capable of displaying every possible unique character associated with a particular audio program. This embodiment of the invention applies to any number of special characters or any type of rare character that may ever be desired to be displayed on display 54. For example, one may be able to transmit and display different type sizes, typefaces, underlined or boldface characters, graphics characters of an artistic nature, or any other type of nonconventional characters.

Figure 5:
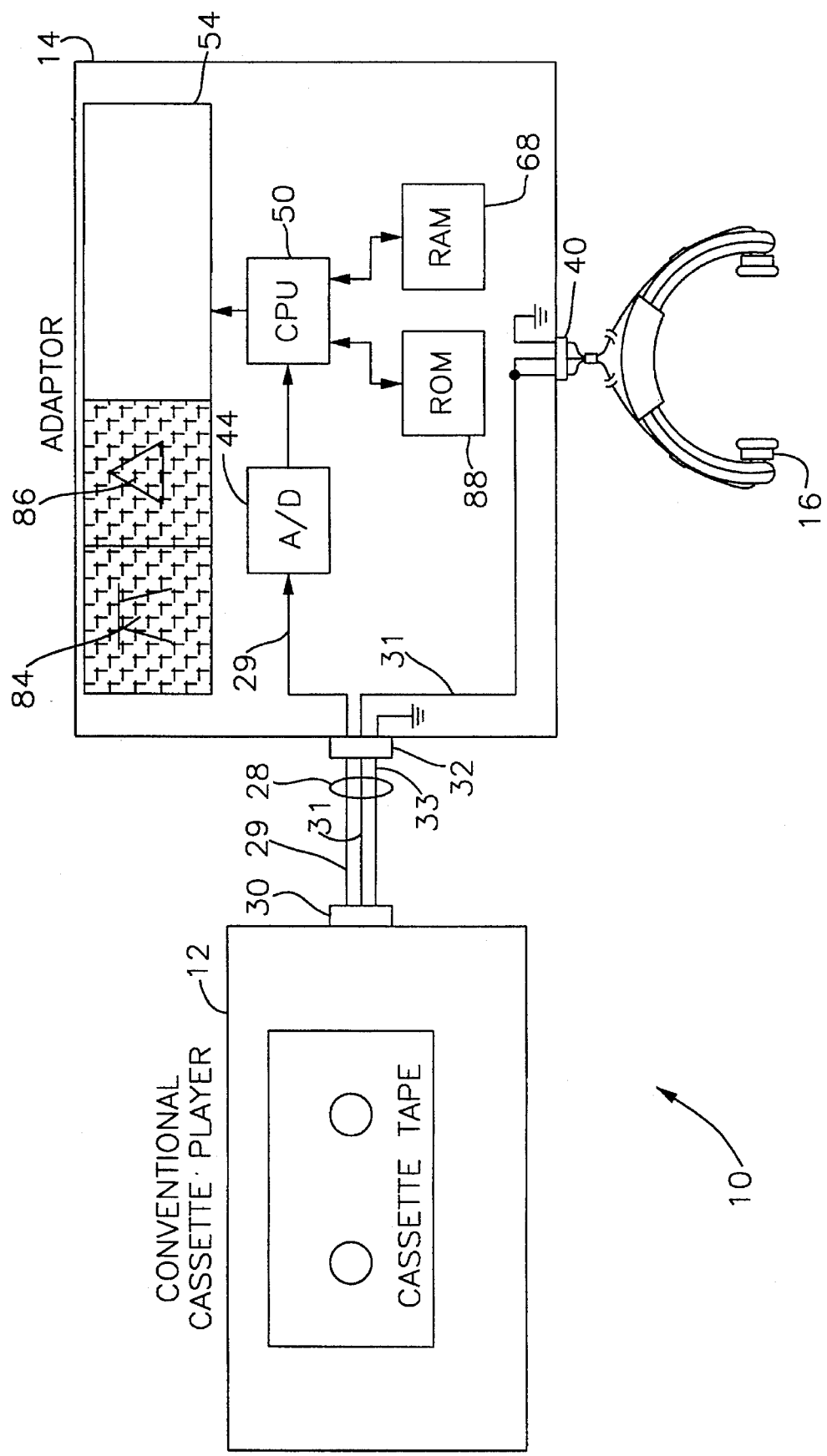
FIG. 5 is an alternative embodiment of a data transmission system incorporating principles of the invention.

To summarize, in the embodiment of FIG. 1 the dot patterns for generating a complete library of characters to be displayed are permanently stored in ROM 58 at adapter 14. Each group on the tape comprises one or more coded characters, e.g., one or more words of alphabetic ASCII characters, mapped to the respective dot patterns in ROM 58, and the respective assigned code comprises a unique (different) character, e.g., a nonalphabetic ASCII character. In the embodiment of FIG. 5, the dot patterns needed to generate the symbolic characters of the particular text data comprise the groups which are stored on the tape with their respective assigned codes. These dot patterns and their respective assigned codes are transmitted to RAM 68 for temporary storage while the particular text data is being displayed. When other text data is later displayed, new dot patterns needed to generate the symbolic characters of such text data are transmitted and stored in RAM 68.

Figure 8:
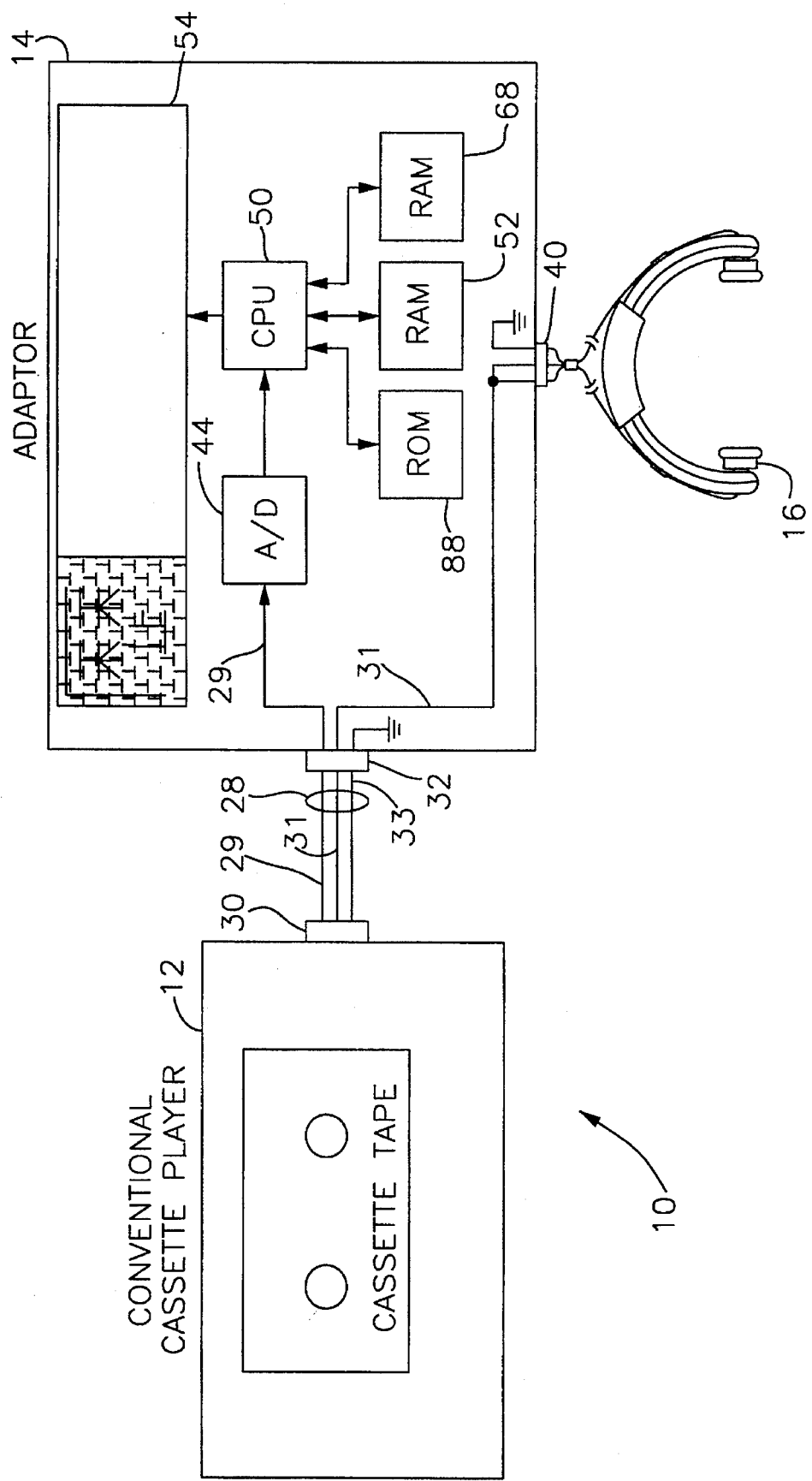
FIG. 8 is a schematic diagram of another embodiment of a data transmission system in accordance with the invention.

Another embodiment of the invention, depicted in FIGS. 8 and 9, combines the principles of the two embodiments shown in FIGS. 1 and 5, and further compresses text data transmission in languages having a large number of characters in their alphabet, such as Chinese. Both RAM 52 for the storage of a table of character codes and their assigned group codes (analogous to Table II in the embodiment of FIG. 1) and RAM 68 for the storage of a table of dot patterns and their assigned character codes (as in the embodiment of FIG. 5) are provided. This embodiment results in both speed and memory advantages and is explained by using the Chinese language as an example.

The Chinese alphabet contains about 7,000 characters whose processing and display require a large amount of memory. As in the case of English song lyrics, the prior art faces the problem of slow transmission of data. Further, as with the case of symbolic characters, the prior art also faces the problem of needing a large ROM for processing and display of the large number of symbolic characters in the Chinese alphabet. One implementation of the prior art requires a ROM that translates each one of the 7,000 possible Chinese characters into a dot matrix format of typically 16×20 dots (i.e., a total of 320 dots). Thus, the typical prior art ROM has a size of 7,000×320 bits (2.2 megabits).

In contrast, the embodiment of the invention shown in FIGS. 8 and 9 requires a much smaller memory for the processing and display of the large number of symbolic characters in the Chinese language. The encoding procedure is similar to that explained in relation to the symbolic characters π and Δ, in that the characters being transmitted are assigned codes, hereafter called character codes, and the dot patterns for these characters are transmitted with their character codes before the text data. Groups of characters that are repeated in the text data are also assigned codes, hereafter called group codes. The group codes and the associated character codes for the characters of each group are transmitted to the adapter before the text data. The encoding procedure is similar to that explained in relation to the English language lyrics, each group of characters being analogous to a word in the embodiment of FIG. 1. The text data is encoded by substituting the assigned group codes for the groups of characters in the order and timing as they occur in the text data relative to the audio program. FIG. 9 shows that the dot patterns defining the symbolic characters needed to display the specific text data and their assigned character codes are stored on segment 110 between segments $SOD_1$ and $SOD_1$, the character codes for the groups of characters and their assigned group codes are stored on segment 120 between segments $SOD_2$ and EOD, and the encoded text data is stored on segments 124 of left channel 106. During playback, the dot patterns and character codes on segment 110 are first transmitted to adapter 14 and stored in RAM 68 as a table and the character codes for the groups of characters and their assigned group codes on segment 120 are first transmitted to adapter 14 and stored in RAM 52 as a table. As the audio program on segment 128 is then played back, the encoded text data in segment 124 is transmitted in the form of group codes in synchronism with the audio program to adapter 14, where CPU 50 decodes the text data in a two-stage process so it can be displayed in real time with the reproduction of the program. First, the group of character codes corresponding to each group code is retrieved in turn from RAM 52, and then the dot patterns corresponding to these character codes are retrieved in turn from RAM 68 for real time display of the text data characters.

The following discussion illustrates the advantages of this embodiment of the invention. Even for languages with a large number of characters in their alphabet, a typical situation of transmission or prerecorded text data, such as prerecorded lyrics of a song, involves fewer than 200 commonly used characters of the alphabet. Using this embodiment of the invention, a RAM size of, for example, 200 bits×16 bits×20 bits is needed to define the dot patterns for the entire set of symbolic characters. Therefore, a total RAM size of only 64 kilobits is required as opposed to the 2.2 megabit ROM required for a general application. This dramatic reduction in the size of the required memory results in a reduced cost of manufacturing or purchasing of the required memory, a reduced power consumption by the memory and a reduced size of the final product.

It should be noted that in the illustrative embodiments, silent periods 116, 122, 126 and 130 on the tape are utilized so that playback and transmission of the audio programs and the encoded text data begin at the same time. As a result, a real time display of the text data can be synchronized or nearly synchronized with the audio program.

As illustrated, the invention can be used to advantage to transmit text data in encoded form simultaneously with audio and/or video programs related to the text data over a channel having limited bandwidth, i.e., data carrying capacity, for synchronized or near synchronized real time display with the program. In such case, it is important to transmit the groups and codes, e.g., Table II, before the program. Under some circumstances, however, the groups and codes can be transmitted after the program, e.g., when the program is stored at the receiver before it is played back.

Although particularly well suited for application to cassette players, the present invention is also applicable to other types of compressed data transmission between a data source and receiver, such as radio or television, CD, or video cassette. For example, the text data can be transmitted in the vertical blanking interval of a television signal that carries the program to which the text data relates. In this application, substantially increased data transmission can take place because of the data compression techniques of the invention.

Another application of the invention is the transmission of electronic TV guides. Here, unlike most of the other described applications of the invention, the text data is not related to the specific program being transmitted with it. In transmission of electronic TV guides, certain data are usually transmitted in groups. For example, the data defining the screen location of a schedule item, and the color and typeface of the item, are usually grouped together. A code is defined for each likely combination of screen location, color and typeface in the text and code data transmission period. Thereafter, only the codes corresponding to each combination, instead of each separate part of the combination, are transmitted. This results in the reduction of transmission time. This embodiment of the invention is particularly advantageous since transmission of TV guides consumes much time and TV broadcast time is more expensive than other signal transmission times discussed thus far.

Still another application of the invention is the transmission, processing and display of text data to be overlaid with TV programs. According to this embodiment, TV broadcast time is saved and also data is displayed in synchronism with the visual program. As a result, a TV viewer may be able to watch TV programs with subtitles displayed in synchronism with fast-changing picture frames. Further, the viewer is able to view the names of performers in synchronism with viewing the performers themselves in situations where many performers appear on the TV screen for a very short time. Further, karaoke or sing-along may also be performed by displaying text data, i.e., lyrics of songs, and the visual and oral program in synchronism.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention.

What is claimed is:

1. A method for transmitting text data with an audio or video program from a transmitter to a receiver, the method comprising the steps of:

arranging the data into groups;

assigning a unique code to each group;

encoding the data so that the codes represent the groups;

transmitting from the transmitter to the receiver the groups and their assigned codes;

storing at the receiver a table correlating each group to its assigned code;

transmitting from the transmitter to the receiver the program and the encoded data; and decoding the encoded data from the table stored in the storing step.

2. The method of claim 1, in which the text data is expressed as alphabetic characters arranged into words and each group comprises one or more of the words.

3. The method of claim 1, in which the text data is expressed as symbolic characters and each group comprises a pattern of dots that defines one of the characters.

4. The method of claim 1, in which the text data is expressed as symbolic characters defined by respective patterns of dots and each group comprises a plurality of characters, the method additionally comprising transmitting from the transmitter to the receiver the patterns of dots and character codes assigned thereby, storing at the receiver a table correlating the patterns of dots and the respective character codes, and generating the patterns from the decoded data.

5. The method of claim 1, in which the groups of data are binary signals comprising a plurality of bits, the codes are binary signals comprising a plurality of bits, and the codes have fewer bits than the groups.

6. The method of claim 1, in which each group of data comprises a plurality of encoded alphabetic ASCII characters and each code comprises a single nonalphabetic ASCII character.

7. The method of claim 1, in which the data is expressed as characters, additionally comprising the steps of reproducing the program, storing in a character generating memory a pattern of dots defining the respective characters, and visually displaying the decoded data in synchronism with the program by recalling the patterns of dots from the memory.

8. The method of claim 7, in which the data comprises alphabetic characters arranged into words and each group comprises one or more of the words.

9. The method of claim 7, in which the data comprises symbolic characters defined by respective patterns of dots and each group comprises one or more of the characters.

10. The method of claim 9, additionally comprising the steps of transmitting from the transmitter to the receiver the patterns of dots and the characters defined thereby, storing in the memory a table correlating that transmitted pattern of dots and the respective characters defined thereby, and generating the patterns of dots from decoded data.

11. The method of claim 1, in which the step of transmitting groups and their assigned codes occurs prior to transmission in the program and the program is related to the text data.

12. The method of claim 11, in which the program is a song and the text data is the lyrics in the song.

13. A method for transmitting data expressed as symbolic characters defined by patterns of dots together with an audio or video program from a transmitter to a receiver, the method comprising the steps of:

assigning a unique code for each character;

transmitting from the transmitter to the receiver the patterns of dots and the unique codes for characters defined thereby; and storing at the receiver a table correlating the patterns of dots and the unique codes for the respective characters defined thereby.

14. The method of claim 13 further comprising the steps of:

transmitting from the transmitter to the receiver the program and the encoded data; and generating the patterns of dots for each character of encoded data from the table stored in the storing step.

15. The method of claim 14, additionally comprising the steps of:

reproducing the program; and visually displaying the patterns of dots for characters of encoded data.

16. The method of claim 15, in which the patterns of dots for characters of encoded data are visually displayed in synchronism with the program.

* * * * *